United States Patent [19]
Glass et al.

[11] 3,923,479
[45] Dec. 2, 1975

[54] MULTIPLE FILTER APPARATUS

[75] Inventors: William H. Glass; Robert J. Bridigum, both of Pittsburgh, Pa.

[73] Assignee: Westinghouse Air Brake Company, Wilmerding, Pa.

[22] Filed: Sept. 21, 1973

[21] Appl. No.: 399,624

[52] U.S. Cl. .................. 55/163; 55/33; 55/213; 55/218; 55/302; 55/DIG. 17
[51] Int. Cl.² .......................................... B01D 53/04
[58] Field of Search ....... 55/33, 163, 302, 180, 213, 55/62, 218, DIG. 17

[56] References Cited
UNITED STATES PATENTS

| | | | |
|---|---|---|---|
| 3,080,693 | 3/1963 | Glass et al. | 55/33 |
| 3,472,000 | 10/1969 | Glass et al. | 55/387 |
| 3,592,563 | 7/1971 | Glass et al. | 55/302 |
| 3,659,399 | 5/1972 | Kauer et al. | 55/33 |
| 3,832,831 | 9/1974 | Ritchie et al. | 55/316 |

*Primary Examiner*—Bernard Nozick
*Attorney, Agent, or Firm*—R. W. McIntire, Jr.

[57] ABSTRACT

A multiple filter apparatus interposed in a compressed air system for removing moisture from compressed air supplied by a compressor to a storage reservoir, said apparatus having at least two filter units and means for effecting alternate purging of moisture from each of said filter units for a period spanning a preselected number of compressor cycles, one such cycle comprising an "on" or "loaded" period and an "off" or "unloaded" period of compressor operation; said means being effective for providing a certain overlap period of purging during the unloaded period of the compressor and during which overlap period both filter units are purged simultaneously.

8 Claims, 3 Drawing Figures

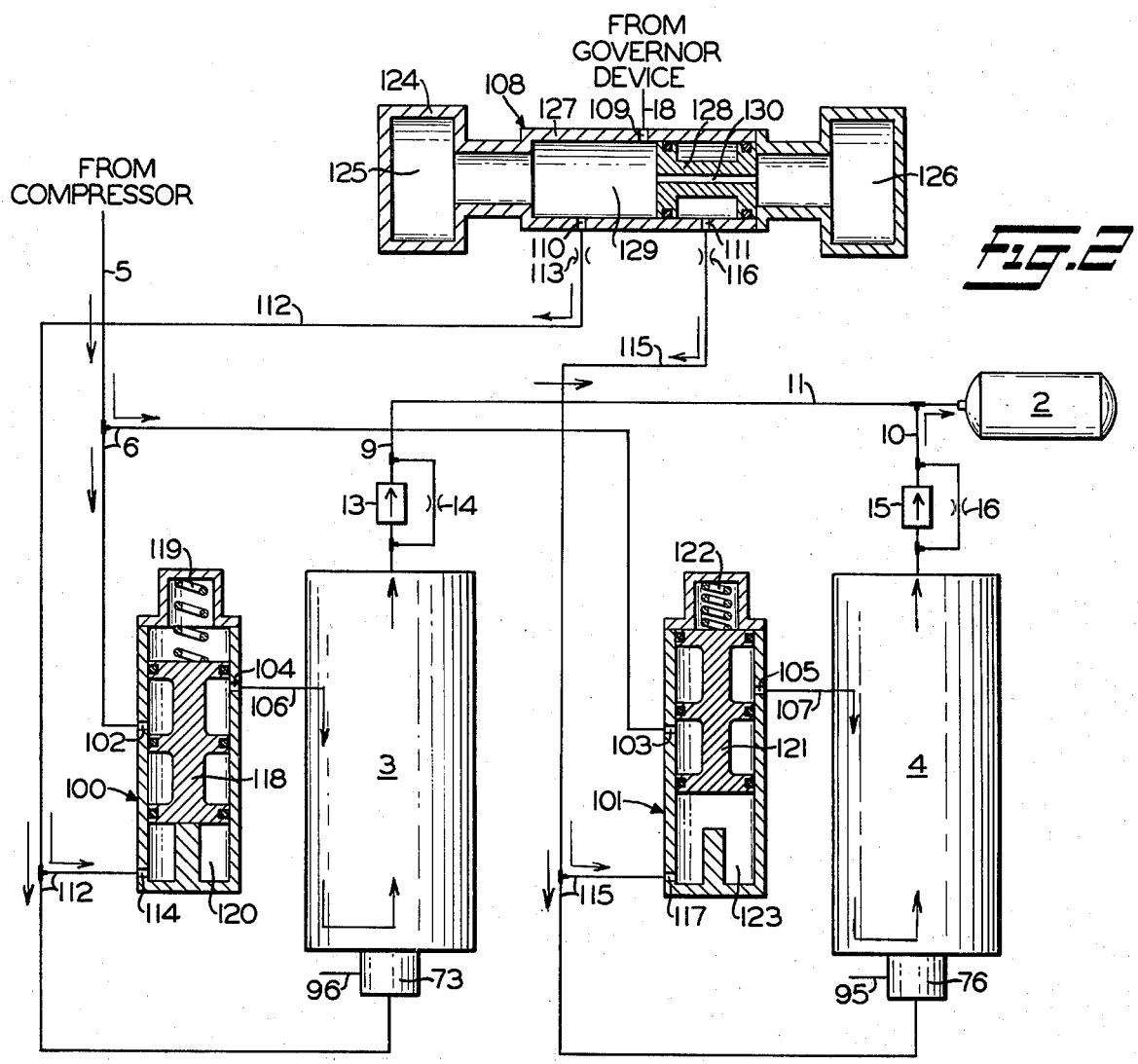

Fig. 2

| GOVERNOR POSITION | COMPRESSOR STAGE | DISPOSITION OF | |
|---|---|---|---|
| | | FILTER UNIT 3 | FILTER UNIT 4 |
| LOADING | CUT IN | FILTERING | PURGED |
| UNLOADING | CUT OUT | PURGED | PURGED |
| LOADING | CUT IN | PURGED | FILTERING |
| UNLOADING | CUT OUT | PURGED | PURGED |
| LOADING | CUT IN | FILTERING | PURGED |
| UNLOADING | CUT OUT | PURGED | PURGED |
| LOADING | CUT IN | PURGED | FILTERING |
| UNLOADING | CUT OUT | PURGED | PURGED |
| LOADING | CUT IN | FILTERING | PURGED |
| UNLOADING | CUT OUT | PURGED | PURGED |

MULTIPLE FILTER APPARATUS

BACKGROUND OF THE INVENTION

Although there are moisture filter apparatus having dual filter units which are arranged so as to be purged alternately, the purging period is usually synchronized with each unloaded or rest period of the compressor, that is, the purge period for each filter unit occurs for a duration of one half of the compressor cycle or the unloaded stage only. Thus, while one filter unit is being purged, the other unit stands ready for filtering operation when the compressor resumes compressing operation. In this arrangement, however, it should be evident that while one of the filter units is being purged during the prevailing compressor rest period, the other unit, which had been purged during the preceding compressor rest period, is serving no purpose, that is, it is neither being purged nor is in operation for drying air during the prevailing period that said one filter unit is being purged. Moreover, on certain occasions, the demand for compressed air, due to heavy usage, for example, is so great that the unloaded or rest periods of the compressor are of very short duration and, therefore, of insufficient time to permit complete purging of the filter units. This may result in a gradual deterioration of the condition and drying ability of the filter units and, consequently, of the quality of the air supplied to the storage reservoir with respect to the dryness thereof.

SUMMARY OF THE INVENTION

The object of the present invention, therefore, is to provide multiple filter apparatus for removing moisture in a compressed air system and in which apparatus the filter units are alternately purged during respective periods spanning a selected number of compressor cycles with the purging periods of the respective filter units overlapping for a certain portion thereof during the rest or unloaded stage of the compressor so that at no time is one of the filter units sitting idle, that is, either not drying compressed air flowing therethrough or not being purged.

Briefly, the invention, though not necessarily limited to such, comprises a pair of filter units interposed between the compressor and a storage reservoir for storing compressed air from the compressor, and changeover means operable responsively to charging and exhausting of the governor unloader pipe for directing the supply of compressed air from the compressor to the reservoir through one of the filter units in alternate order with the other during successive loaded phases of the compressor with each of the filter units being purged for three successive phases of the compressor in the order of unloaded, loaded, and unloaded phases and with both filter units being purged concurrently during each unloaded phase of the compressor. Thus, each of the filter units is cut out and purged for a period spanning one and one-half cycles of compressor operation while being cut in for removing moisture from compressed air flowing therethrough during one-half cycle.

In the drawing,

FIG. 2 is a schematic view of a modified version of the multiple filter apparatus shown in FIG. 1;

Figure 1:
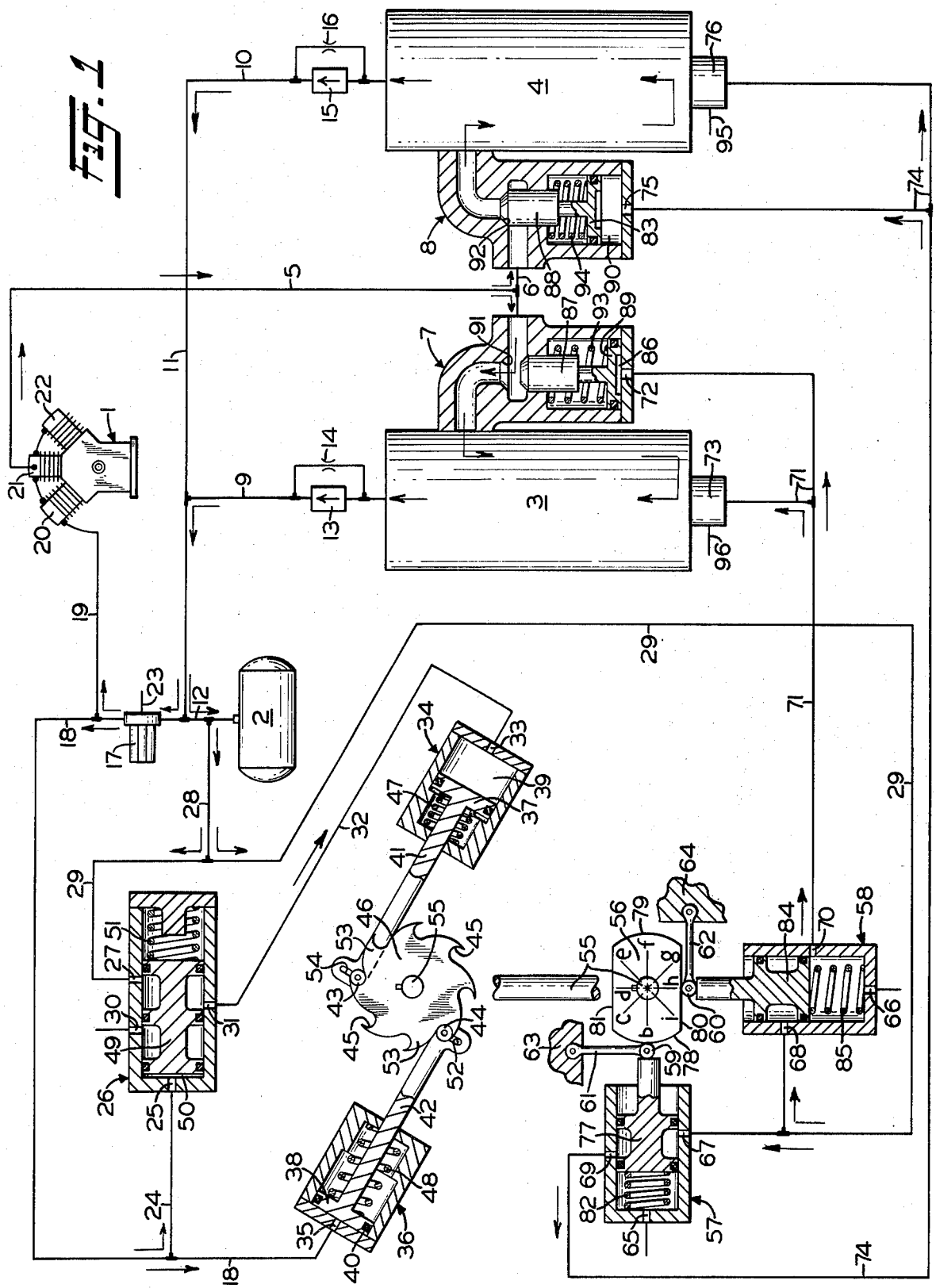
FIG. 1 is a schematic view of one embodiment of a multiple filter apparatus embodying the invention.

and FIG. 3 is a table representing the operational cycles of the filter apparatus shown in FIGS. 1 and 2.

DESCRIPTION AND OPERATION

As shown in FIG. 1, the multiple filter system embodying the invention comprises an air compressor 1 for supplying compressed air for the system, said compressed air being stored in a storage reservoir 2 via a pair of filter units 3 and 4, which are arranged, as will be described in detail hereinafter, for alternate operation in drying the compressed air flowing therethrough during successive loaded phases of the compressor. Each of the filter units 3 and 4 contain a suitable form of desiccant for absorbing moisture from the air flowing therethrough.

Compressed air flows from the compressor 1 via a conduit or pipe 5 to a conduit or pipe 6 branching off to cut-off valve devices 7 and 8 operably connected to the inlet sides of filter units 3 and 4, respectively. The outlet sides of filter units 3 and 4 are connected by conduits or pipes 9 and 10, respectively, to a pipe or conduit 11 which, in turn, is connected by a pipe 12 to reservoir 2 in the embodiment shown in FIG. 1, while being connected directly to said reservoir in the embodiment shown in FIG. 2.

A one-way check valve device 13 providing for flow in the direction indicated by the arrow is interposed in pipe 9 with a choke device 14 arranged in parallel relation to the check valve to permit restricted flow in both directions. A check valve device 15 and choke device 16 are similarly interposed in pipe 10.

As shown in FIG. 1, a conventional governor device 17 connected to reservoir 2 via pipe 12 operates in well-known manner in response to a certain high pressure, when attained in said reservoir, to an unloading position in which fluid pressure is supplied via pipes 18 and 19 to unloader devices 20, 21, and 22 in the compressor 1 for unloading the compressor to cut out the compressing action. When pressure in reservoir 2 has reduced to a certain low pressure, governor device 17, in response thereto, operates to a loading position in which unloader devices 20, 21, and 22 are relieved of fluid pressure via a vent 23 in the governor device for causing the compressor 1 to be cut in to resume compressing action.

Pipe 18 is also connected via a branch pipe 24 to a control port 25 of a control valve device 26, said control valve device having a supply port 27 connected via pipe 12, a branch pipe 28, and a pipe 29 to reservoir 2. Control valve device 26 is also provided with an exhaust port 30 and a delivery port 31, the latter being connected via a pipe 32 to a control port 33 of an operating cylinder 34. Pipe 18 is also connected to a control port 35 of an operating cylinder 36.

The operating cylinders 34 and 36 are provided with operating pistons 37 and 38 subjectable on the sides adjacent control ports 33 and 35 to fluid pressure delivered therethrough into pressure chambers 39 and 40, respectively. The opposite sides of operating pistons 37 and 38 have piston stems 41 and 42 extending therefrom to the exterior of the cylinders, said piston stems having at the free ends thereof rollers 43 and 44, respectively, each operatively engaging one of a plurality of notches 45 formed in a sprocket wheel 46. Fluid pressure introduced into the chambers 39 and 40, in a manner to be hereinafter described, causes the piston stems 41 and 42 to be extended outwardly of the cylinders 34 and 36, respectively, to extended positions, in which stem 41 of cylinder 34 is shown, to effect rotation of sprocket wheel 46 one notch, while springs 47 and 48 urge said stems inwardly of said cylinders, respectively, to retracted positions, in which stem 42 of cylinder 36 is shown, to effect resetting of the respective roller of the rollers 43 and 44 into the succeeding notch of the sprocket wheel.

The control valve device 26 may be of any suitable type for controlling communication between the several ports therein, and in this instance is illustrated as a spool type valve device having a valve member 49 operably disposed therein. In the absence of fluid pressure in pipe 18 (when the governor device 17 is in its loading position), and consequently in control port 25 and a pressure chamber 50 opening thereto, a spring 51 urges valve member 49 to a supply position in which exhaust port 30 is isolated, and supply port 27 is communicated with delivery port 31, whereby fluid pressure from reservoir 2 is supplied via pipes 12, 28, 29, and 32 to control port 33 and pressure chamber 39 of operating cylinder 34 to cause such pressure acting on piston 37 to operate piston stem 41 to its extended position. Sprocket wheel 46 is thus rotated one notch, in a counterclockwise direction as viewed in FIG. 1, for a purpose to be hereinafter disclosed.

At the same time as pressure prevails in chamber 39 of cylinder 34, chamber 40 of cylinder 36 is vented to atmosphere via pipe 18 and exhaust port 26 in governor device 17, so that said cylinder 36 offers no interference of rotation of the sprocket wheel by cylinder 34. A radially disposed slot 52 is formed in the end of piston stem 42 to allow roller 44 to ride over and clear the adjacent tooth of a plurality of teeth 53 comprising the sprocket wheel 46. The end of piston stem 41 of cylinder 34 is provided with a similar radially disposed slot 54 for a similar purpose when operating cylinder 36 effects rotation of sprocket wheel 46.

When the governor device 17 operates to its unloading position, as above described, pipe 18 is charged with fluid pressure which also flows via pipe 24 to chamber 50 of control valve device 26. Pressure acting on the adjacent side of valve member 49 overcomes the opposition of spring 51 to cause said valve member to be operated out of its supply position to an exhaust position in which supply port 27 is isolated from delivery port 31, the latter being placed in communication with exhaust port 30 to permit pressure from chamber 39 of cylinder 34 to be vented to atmosphere via pipe 32 and said exhaust port. Spring 47 in cylinder 34 is thus rendered effective for operating piston stem 41 to its retracted position.

At the same time, fluid pressure prevailing in charged pipe 18 becomes effective via port 35 in chamber 40 of cylinder 36 to cause piston stem 42 to be operated to its extended position for causing sprocket wheel 46 to be rotated one notch in similar manner as effected by operating cylinder 34.

As above set forth, it is evident, therefore, that operating cylinders 34 and 36 are actuated alternately, as determined by alternate operation of the governor device 17 between its unloading and loading positions, to cause sprocket wheel 46 to be rotated one notch for each operation of said cylinders.

Sprocket wheel 46 is concentrically fixed on one end of a shaft 55 for effecting rotation of said shaft which has a rotary cam member 56 fixed on the opposite end thereof. The cam member 56 is rotated correspondingly to the rotation of sprocket wheel 46 for effecting operation of a pair of supply valve devices 57 and 58 through a pair of cam followers 59 and 60 carried on the free ends of support arms 61 and 62 the other ends of which are rotatably anchored on suitable fixed means as indicated at 63 and 64, respectively, for a purpose to be subsequently disclosed.

For purposes of convenience in describing the structure and operation thereof, sprocket wheel 46, cam member 56, and the sectional views of operating cylinder 34 and 36 and of supply valve devices 57 and 58 have all been rotated 90° relative to the plane surface of the drawing so that the views of such components coincide with said plane surface.

The supply valve devices 57 and 58, which are of conventional spool type variety, are respectively provided with exhaust ports 65 and 66, supply ports 67 and 68, which are both connected to pipe 29, and delivery ports 69 and 70. Delivery port 70 of supply valve device 58 is connected via a pipe 71 to a control port 72 of cut-off valve device 7 and to a drain valve device 73 of filter unit 3. Delivery port 69 of supply valve device 57 is connected via a pipe 74 to a control port 75 of cut-off valve device 8 and to a drain valve device 76 of filter unit 4.

Supply valve device 57 comprises a valve member 77 having an axially extending portion contacted by cam follower 59 and operable by cam member 56, when said cam member is in such position as to have one of two maximum-radius, diametrically oppositely formed cam surfaces 78 and 79 in contact with said cam follower, to a supply position in which it is shown and in which supply port 67 is communicated with delivery port 69 to permit supply of fluid pressure from reservoir 2 to flow to control port 75 of cut-off valve 8 and to drain valve 76 via pipes 28, 29, and 74. When cam member 56 has been rotated by sprocket wheel 46 and shaft 55 to such an extent as to position one or the other of two shorter-radius, diametrically oppositely formed cam surfaces 80 and 81 into contact with cam follower 59, a spring 82 in supply valve 57 operates valve member 77 to a vent position in which supply port 67 is cut off from delivery port 69 and the latter is communicated with exhaust port 65 to effect exhaustion of fluid pressure from drain valve 76 of filter unit 4 and from control port 75 and a pressure chamber 83 opening thereto in cut-off valve device 8, to atmosphere via pipe 74.

Supply valve device 58, which is also provided with a valve member 84 and a spring 85 identical to those in supply valve device 57 functions in identical manner as device 57 in effecting supply of fluid pressure to drain valve device 73 and to control port 72 of cut-off valve device 7 and exhaustion of such fluid pressure therefrom via pipe 71 and exhaust port 66. Control port 72 opens a pressure chamber 86 in cut-off valve device 7.

Both of the cut-off valve devices 7 and 8 may be of any suitable type, and in this instance are illustrated as conventional poppet type devices comprising, respectively, valve members 87 and 88 operable by pistons 89 and 90, when subjected to fluid pressure in chambers 86 and 83, respectively, to closed or seated positions on valve seats 91 and 92 to cut off flow of fluid pressure therepast from pipe 6 to the filter units 3 and 4. In the absence of fluid pressure in pressure chambers 86 and 83, springs 93 and 94 are provided for operating pistons 89 and 90, and therefore valves 87 and 88, to respective open or unseated positions relative to valve seats 91 and 92 to permit flow of fluid pressure therepast from pipe 6 (and compressor 1 via pipe 5) to filter units 3 and 4, respectively.

Since, as shown, though not necessarily limited thereto, sprocket wheel 46 has eight equiangularly spaced teeth or notches formed thereon, rotation of said sprocket wheel one notch, as above described, produces a corresponding increment of rotation of cam member 56, or an angular displacement of 45°. Cam member 56, therefore, is operable to eight positions equiangularly spaced apart at intervals of 45°, said positions being indicated in the drawing by the letters b through i, respectively. Positions i, b, and c span one of the maximum-radius cam surfaces, while positions e, f, and g span the opposite maximum-radius surface. Positions d and h coincide with the oppositely disposed shorter-radius cam surfaces, respectively.

In considering the operation of the filter apparatus shown in FIG. 1, it may be assumed that governor device 17, in response to reduction of fluid pressure in reservoir 2 to the certain low pressure, has just operated to its loading position in which, as above described, fluid pressure in chamber 40 of operating cylinder 36 and in chamber 50 of control valve device 26 is exhausted via pipe 18 and exhaust port 23 of the governor device. Thus, spring 48 of operating cylinder 36 operates piston 38 and piston stem 42 to their retracted position, in which it is shown, and spring 51 of control valve device 26 operates valve member 49 to its supply position in which it is shown and in which, as above noted, fluid pressure is supplied to chamber 39 of operating cylinder 34 for effecting operation of piston 37 and piston stem 41 to their extended position, in which they are shown, and therefore, rotation of sprocket wheel 46 one notch. Cam member 56 is correspondingly rotated one increment also, so that with respect to cam follower 59, said cam member is moved from position i to position b, and with respect to cam follower 60, from position g to position h, in which position said cam member is shown.

Thus, with cam follower 60 at position h relative to cam member 56, that is, on the shorter-radius cam surface, valve member 84 of supply valve device 58 is operated by spring 86 to its vent position in which chamber 86 of cut-off valve device 7 is vented to atmosphere via pipe 71 and exhaust port 66. Consequently, valve member 87 is operated by spring 93 to its open position in which fluid pressure from compressor 5 may flow through filter unit 3, check valve 13, and pipes 9 and 12 to reservoir 2. With valve member 84 of valve device 58 in its vent position, drain valve device 73 is also relieved of fluid pressure in response to which said drain valve is closed to cut off any flow or escape of fluid pressure therethrough to atmosphere from the filter unit 3 and the sytem.

At the same time, with cam follower 59 at position b of the cam member 56, that is, on the maximum-radius cam surface, valve member 77 of supply valve device 57, as above noted, occupies its supply position in which fluid pressure from pipe 29 may flow through pipe 74 to chamber 90 of cut-off valve device 8 to cause valve member 88 to be operated to its closed position, thereby cutting off flow of fluid pressure through filter unit 4. At the same time drain valve device 76 is subjected to fluid pressure and operable responsively thereto to an open position in which fluid pressure may flow reversely, at a restricted rate, from reservoir 2, via pipes 12, 11, and 10, choke 16, filter unit 4, and an exhaust port 95 in said drain valve for purging said filter unit of moisture accumulated therein during a previous period of fluid pressure flow therethrough.

Flow of fluid pressure through filter unit 3, and purging of moisture from filter unit 4 continues as long as compressor 1 continues in its loaded or compressing operation. When pressure in reservoir 2 attains the certain high pressure to which the governor device responds and operates to its unloading position, above defined, for unloading compressor 1, pipe 18 is charged with fluid pressure to thereby effect operation of the control valve device to cut off supply of fluid pressure therethrough to operating cylinder 34 and, at the same time, charge chamber 40 of operating cylinder 36. Piston stem 41 of operating cylinder 34 is, therefore, operated to its retracted position, while piston stem 42 of operating cylinder 36 is operated to its extended position to thereby rotate sprocket wheel 46 one notch and correspondingly rotate cam member 56 one position. Thus, cam follower 59 is positioned adjacent position c, and cam follower 60 is positioned adjacent position i, both of which are in the maximum-radius cam sectors, so that the disposition of supply valve device 57 remains unchanged, while valve member 84 of supply valve device 58 is changed over from its vent position to its supply position to effect supply of fluid pressure to chamber 86 of cut-off valve device 7 and to drain valve 73. Under these conditions, cut-off valve device 7, in a manner similar to that described above in connection with filter unit 4, cuts off flow of fluid pressure through filter unit 3, and drain valve device 73 is opened to allow purging of filter unit 3 via an exhaust port 96 in said drain valve.

It should be noted from the above description of operation that the operating cylinders 34 and 36 are alternately charged with and relieved of fluid pressure coincidentally with operation of the governor device 17 to its unloading and loading positions, respectively, said cylinder 34 being subjected to fluid pressure when said governor device is in its loading position, while cylinder 36 is subjected to fluid pressure with said governor device in its said unloading position. Even if the order of alternate supply of fluid pressure to the operating cylinders relative to the operation of the governor device were reversed, if so desired, the apparatus would function as described.

It should also be noted, by relating the several positions of the cam member 56 to the cam followers 59 and 60 of the respective supply valve devices 57 and 58, that during each period that compressor 1 is in its unloaded or non-compressing stage, both said cam followers are at respective maximum-radius positions of the cam member 56, and that each of the filter units 3 and 4 is retained in a purge disposition for three successive loaded and unloaded stages of the compressor with the two filter units alternating for filtering fluid under pressure flowing therethrough on successive loaded stages of the compressor. Thus, by providing filtering apparatus with a plurality of filter units each one of which is alternately purged over an extended period of time such as three successive stages, loaded and unloaded, of compressor operation, complete dryness of the filter unit is assured for its next filtering period.

The relationship or order of filtering and purging periods for each of the filter units 3 and 4 relative to cyclical operation of the governor device 17 and compressor 1 is illustrated graphically for several successive cycles by the table shown in FIG. 3 of the drawings.

It should be further understood that the number of successive operational periods during which the filter units are purged may be varied by modifying the number of notches on the sprocket wheel 46 and the related contour of cam member 56.

The embodiment of the invention shown in FIG. 2 operates in cyclical fashion similar to the apparatus shown in FIG. 1 except that the poppet type cut-off valve devices 7 and 8 shown in FIG. 1 are replaced by spool type cut-off valve devices 100 and 101, which substitution is merely a variation of choice since both types perform similar functions. Cut-off valve devices 100 and 101 have supply ports 102 and 103 connected to branches of pipe 6, respectively, and delivery ports 104 and 105 connected to filter units 3 and 4 via pipes 106 and 107, respectively.

Although compressor 1 and the governor device 17 are not shown in FIG. 2, it should be understood that the apparatus, as shown in FIG. 2, is intended to be used in connection with an air compressor controlled by a governor device similar to that shown in FIG. 1.

The portion of the filter apparatus shown in FIG. 1 comprising control valve device 26, operating cylinders 34 and 36, sprocket 46, cam member 56, and supply valve devices 57 and 58, is replaced in the filter apparatus shown in FIG. 2 by a shuttle type control valve device 108 provided with a control port 109, which is connected to pipe 18 from the governor device 17, and two delivery ports 110 and 111. Delivery port 110 is connected via a delivery pipe 112, in which a choke 113 is interposed, with a control port 114 in cut-off valve device 100 and with the drain valve device 73 of filter unit 3. Delivery port 111 is connected via a delivery pipe 115, in which a choke 116 is interposed, to a control port 117 in cut-off valve device 101 and to the drain valve device 76 of filter unit 4. Pipe 18, in this embodiment may be considered an air pressure supply pipe.

Cut-off valve device 100 is provided with a spool valve member 118 which is urged by a spring 119 toward an open position, in which it is shown and in which supply port 102 is communicated with delivery port 104, whereby fluid under pressure from compressor 1 via pipes 5 and 6 may flow through pipe 106, filter unit 3, check valve 13, and pipes 9 and 11 to reservoir 2. Cut-off valve device 100 is also provided with a pressure chamber 120 into which fluid pressure, via control port 114, may be introduced for effecting operation of valve member 118 to a closed position in which communication between supply port 102 and delivery port 104, and therefore flow of fluid under pressure through filter unit 3, is cut off. Cut-off valve device 101 is also provided with a spool valve member 121, (which is shown in its closed position) a spring 122, and a pressure chamber 123, and functions in a manner similar to that discussed above in connection with cut-off valve device 100 in controlling flow of fluid under pressure from compressor 1, via pipes 5 and 6, through filter unit 4 to reservoir 2.

Control valve device 108 comprises a casing 124 having pressure chambers 125 and 126 of equal volume formed at opposite ends thereof and separated by a central cylindrical casing portion 127 in which the several ports 109, 110, and 111 are formed. A shuttle valve member 128 is reciprocably operable within a valve chamber 129 in central casing portion 127 between a first position, in which it is shown and in which control port 109 is isolated from delivery port 111 and communicated with delivery port 110, and a second position in which control port 109 is isolated from delivery port 110 and communicated with delivery port 111, depending upon the pressure relationship between pressure chambers 125 and 126.

Shuttle valve member 128 is in the form of a spool valve having respective pressure areas at the ends thereof subject to the prevailing pressure in chambers 125 and 126, respectively, and having a passageway or bore 130 extending coaxially therethrough to permit equalization of fluid pressure between said chambers, as will hereinafter be explained.

In considering the operation of the filter apparatus shown in FIG. 2, it may be assumed that control valve device 108 and cut-off valve devices 100 and 101 are in the positions shown, and that governor device 17, in response to attainment of the certain high pressure by the fluid in reservoir 2, has just operated to its unloading position. Supply pipe 18, therefore, is charged with fluid pressure which may flow via control port 109, valve chamber 129, delivery port 110, and delivery pipe 112 to cut-off valve device 100 for operating valve member 118 of said cut-off valve device to its closed position, and to drain valve device 73 for opening it, thus cutting off flow of fluid pressure through said cut-off valve device and permitting backflow of fluid pressure, at a restricted rate, from reservoir 2 via pipes 11 and 9, choke 14, filter unit 3, and drain valve device 73, thereby purging said filter unit of moisture accumulated therein. Fluid pressure in valve chamber 129 also flows through passageway 130 for equalizing such pressure on both sides of shuttle valve 128 which thereby remains in its second position. At the same time, with shuttle valve 128 in its second position, as shown, fluid pressure supplied to chamber 123 of cut-off valve device 101 and to drain valve 76 during a previous unloading period of the compressor, is trapped therein, thus holding valve member 121 in its closed position and said drain valve open to allow purging of filter unit 4 to continue simultaneously with purging of filter unit 3.

When pressure in reservoir 2 is again reduced, such as from usage, to the certain low value, governor device 17 operates to its loading position in which fluid pressure in supply pipe 18, as above explained, is exhausted via exhaust port 23 in said governor device. Pressure in valve chamber 129 and in chamber 125 is immediately exhausted along with that in pipe 18, but choke 113 in delivery pipe 112 delays reduction of pressure in chamber 120 of cut-off valve device 100 and from drain valve 73 sufficiently to allow shuttle valve 128 to be shifted leftwardly, as viewed in the drawing, by the momentarily higher pressure in chamber 126 to its first position to thereby trap the pressure in chamber 120 and drain valve 73 so that filter unit 3 continues to be purged.

With the shifting of shuttle valve 128 from its second position to its first position, port 111 is communicated with port 109 so that fluid pressure previously trapped in chamber 123 of cut-off valve device 101 and in drain valve 76 is exhausted via delivery pipe 115, choke 111, control valve device 108, pipe 18, and vent 23 of governor device 17. Drain valve 76 is depressurized and thus closed, and, with chamber 123 depressurized also, spring 122 of cut-off valve device 101 operates valve member 121 to its open position in which fluid pressure from compressor 1, via pipes 5 and 6, may flow through filter unit 4 to reservoir 2 until the pressure in said reservoir has again attained the certain high pressure. With pressure in reservoir 2 again at the certain high pressure, the apparatus operates, as above described, to effect purging of filter unit 4 simultaneously with purging of filter unit 3 because shuttle valve 128 will remain in its first or leftward position, as was the case when said shuttle valve was in its second or rightward position during the unloading phase of governor device 17.

As in the case of the apparatus shown in FIG. 1, and as indicated in the table shown in FIG. 3, both filter units 3 and 4 are purged simultaneously during each unloaded phase of compressor 1 and are alternately cut in during successive loaded phases of the compressor for removing moisture from the compressed air flowing therethrough. In other words, each filter unit is purged for a period of three successive phases of operation of the compressor, including loading and unloading, that is, for a period equivalent to one and one-half cycles of compressor operation, while the moisture removal period is equivalent to a one-half cycle (loaded phase) of the compressor, with both units always being purged simultaneously during the unloaded phase of the compressor. At no time, however, are the two filter units 3 and 4 performing the filtering function simultaneously.

Having now described the invention, what we claim as new and desire to secure by letters patent is:

1. In an apparatus for a compressed air system including an air compressor, a reservoir connected to filter units and to the compressor for storing compressed air therefrom, and a governor device connected to the reservoir and the compressor and operable cyclically and alternately responsively to compressed air in the reservoir at a certain high pressure to an unloading position for unloading the compressor and to compressed air in the reservoir at a certain low pressure to a loading position for loading the compressor:
   a. a plurality of conduit means arranged in parallel relation with each other and each having interposed therein respective parallel choke and one-way check valve means via which compressed air may flow in one direction at an unrestricted rate from the compressor to the reservoir and in a reverse direction at a restricted rate from the reservoir;
   b. a plurality of filter units interposed respectively in said plurality of conduit means between the compressor and the respective choke and check means, said filter units including means for filtering and accumulating moisture from compressed air flowing therethrough in said one direction and being purged of such accumulated moisture by compressed air flowing therethrough in said reverse direction to atmosphere, and including valve means connected to the compressor to alternately pass moisture laden air from compressor to the filter units; and wherein the improvement comprises:
   c. purging means connected to the governor, reservoir and filter units for effecting filtering and purging operations of the filter units in such order of operation as to effect flow of compressed air in said reverse direction through all the filter units during each operation of the governor device to its said unloading position, and to effect flow of compressed air in said reverse direction through a selected number of said filter units and in said one direction through the others during each operation of the governor device to its said loading position.

2. Multiple filter apparatus for a compressed air system, as set forth in claim 1, wherein:
   a. said conduit means comprises:
      i. first conduit means having interposed therein first choke and one-way check means; and
      ii. second conduit means having interposed therein second choke and one-way check means;
   b. said plurality of filter units comprises:
      i. a first filter unit interposed in said first conduit means and including a first cut-off valve device operable in an open position for providing said flow in said one direction and in a closed position for cutting off said flow in said one direction, and a normally closed drain valve providing a purge communication for said flow in said reverse direction when in an open position; and
      ii. a second filter unit interposed in said second conduit means and including a second cut-off valve device operable in an open position for providing said flow in said one direction and in a closed position for cutting off said flow in said one direction, and a normally closed drain valve providing a purge communication for said flow in said reverse direction when in an open position; and
   c. said predetermined order of operations of the purging means comprises operation of both cut-off valve devices to their respective closed positions and both drain valves to their respective open positions during each operation of the governor device to its said unloading position, and operation of one of the cut-off valve devices of one of the filter units to its said closed position and the respective drain valve device thereof to its said open position alternately with respect to the cut-off valve device and drain valve of the other filter unit during each operation of the governor device to its said loading position.

3. Multiple filter apparatus for a compressed air system, as set forth in claim 2, wherein:
   a. said cut-off valve devices are spring-biased to their respective open positions and are operable responsively to air pressure to their respective closed positions, and
   b. said drain valves are normally biased to their respective closed positions and operable responsively to air pressure to their respective open positions,
   c. said purging means being operable for effecting supply and release of air pressure to and from, respectively, said cut-off valve devices and said drain valves selectively and in coincidence with said order of operations.

4. Multiple filter apparatus for a compressed air system, as set forth in claim 3, wherein said purging means comprises:
   a. respective supply valve devices connected to the reservoir and operative in a vent position for effecting said release of air pressure from the respective cut-off valve devices and drain valves, and being operable to a supply position for effecting said supply of air pressure from the reservoir to the respective cut-off valve devices and drain valves;
   b. cam means operable to a plurality of positions corresponding to the number of operations included in a complete cycle of said order of operations for effecting operation of said supply valve devices accordingly; and c. control means operable responsively to a plurality of successive operations of the governor device to its said unloading and loading positions corresponding in number to said plurality of positions of said cam means for effecting operation of the cam means and said supply valve devices accordingly.

5. Multiple filter apparatus for a compressed air system, as set forth in claim 4, wherein said cam means comprises:
   a. a rotary cam member fixed at one end of a shaft for rotation therewith and operably engaging said supply valve devices; and
   b. a sprocket member fixed at the other end of said shaft for rotation therewith, said sprocket member having peripherally formed thereon a plurality of notches corresponding in number to said plurality of cam positions; and wherein said control means comprises;
   c. a pair of operating cylinders having respective movable stems each operably engaging one notch of the sprocket member, each of said operating cylinders being operable responsively to air pressure for operating the respective stem thereof to an extended position to cause rotation of the sprocket member one notch and being operable upon relief of such air pressure acting thereon for causing the stem to be retracted from said extended position; and
   d. a control valve device including a valve member normally biased to a supply position, in which one of said operating cylinders is supplied with compressed air from the reservoir concurrently with venting of air pressure from the other operating cylinder in coincidence with operation of the governor device to its said loaded position,
   e. said valve member being operable, responsively to air pressure supplied thereto from the governor device coincidentally with operation of the governor device to its said unloaded position, to an exhaust position in which said one of said operating cylinders is relieved of compressed air acting thereon concurrently with supply of air pressure to said other of said operating cylinders.

6. Multiple filter apparatus for a compressed air system, as set forth in claim 3, wherein said purging means comprises:
   a. a supply pipe connected to the governor device and a pair of delivery pipes connected to respective ones of said cut-off valve devices and said drain valve devices for providing communication via which air pressure from the governor device, when in its unloading position, may be communicated selectively to said cut-off valve devices and said drain valve devices for effecting operation thereof to their respective cut-off and open positions; and
   b. a control valve device interposed between said supply pipe and said delivery pipes and operable responsively to successive operations of the governor device to its said loading and unloading positions for selectively communicating said air pressure from the governor device to the cut-off valve devices in such manner as to effect said order of filtering and purging operations of the filter units.

7. Multiple filter apparatus for a compressed air system, as set forth in claim 6, wherein said control valve device includes:
   a. a shuttle valve member subjectable on opposite ends thereof to air pressure from the governor device during each successive operation thereof to its unloading position and operable, in response to predominating pressure acting on one or the other of said opposite ends, between a first position, in which said supply pipe is communicated with one of said delivery pipes and cut off from the other, and a second position in which said supply pipe is communicated with said other and cut off from said one of said delivery pipes; and
   b. means formed partly in said shuttle valve member and partly in said delivery pipes for determining said predominating pressure acting on said one or said other of said opposite ends for effecting operation of said cut-off valve devices and drain valve devices to produce said order of filtering and purging operations of the filter units.

8. Multiple filter apparatus for a compressed air system, as set forth in claim 7, wherein said means formed in said shuttle valve member comprises a passageway extending axially therethrough for communicating said opposite ends with each other, and said means formed in said delivery pipes comprises respective chokes interposed in each delivery pipe between said control valve device and the respective cut-off and drain valve devices for controlling flow of compressed air therethrough to a restricted rate.

* * * * *